(12) United States Patent
Subbumurugesan et al.

(10) Patent No.: US 11,569,980 B2
(45) Date of Patent: Jan. 31, 2023

(54) COMBINED SBOX AND INVERSE SBOX CRYPTOGRAPHY

(71) Applicant: International Business Machines Corporation, Armonk, NY (US)

(72) Inventors: Logesh Subbumurugesan, Bangalore (IN); Archana Ravikumar, Salem (IN); Umadevi Sureshbabu, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 605 days.

(21) Appl. No.: 16/689,466

(22) Filed: Nov. 20, 2019

(65) Prior Publication Data

US 2021/0152329 A1 May 20, 2021

(51) Int. Cl.
| | |
|---|---|
| H04L 9/06 | (2006.01) |
| H03M 13/09 | (2006.01) |
| G06F 7/72 | (2006.01) |
| G06F 17/16 | (2006.01) |
| H03M 13/15 | (2006.01) |

(52) U.S. Cl.
CPC ............ *H04L 9/0631* (2013.01); *G06F 7/724* (2013.01); *G06F 17/16* (2013.01); *H03M 13/091* (2013.01); *H03M 13/158* (2013.01); *H04L 9/0637* (2013.01); *H04L 2209/122* (2013.01); *H04L 2209/34* (2013.01)

(58) Field of Classification Search
CPC ..... H04L 9/0631; H04L 9/0637; G06F 7/724; G06F 17/16; H03M 13/091; H03M 13/158
See application file for complete search history.

(56) References Cited

U.S. PATENT DOCUMENTS

| | | | |
|---|---|---|---|
| 10,148,426 B2 | 12/2018 | Kounavis | |
| 2005/0058285 A1 | 3/2005 | Stein | |
| 2010/0322412 A1 | 12/2010 | Hung | |
| 2017/0353298 A1 | 12/2017 | Ghosh | |
| 2019/0179618 A1 | 6/2019 | Noor | |
| 2019/0229889 A1* | 7/2019 | Kounavis | .............. H04L 9/0631 |

OTHER PUBLICATIONS

Ahmad et al., "Design of AES S-box using combinational logic optimization," 2010 IEEE Symposium on Industrial Electronics and Applications (ISIEA), Oct. 3-5, 2010, 4 pages.

(Continued)

*Primary Examiner* — Oleg Korsak
(74) *Attorney, Agent, or Firm* — Brian D. Welle (57) ABSTRACT

Hardware circuitry defines logic for both Sbox generation and inverse Sbox generation via generating a multiplicative inverse matrix as a truth table for data. The hardware circuitry receives input plain text to be encrypted. The hardware circuitry divides the input plain text to be encrypted. The hardware circuitry feeds multiplicative inverse values generated from the input plain text to a transformer module for performing affine to encrypt the plain text data. The hardware circuitry receives encrypted data to be decrypted. The hardware circuitry divides the encrypted data to be decrypted. The hardware circuitry feeds multiplicative inverse generated from the encrypted data to the transformer module for performing inverse affine to decrypt the encrypted data.

15 Claims, 4 Drawing Sheets

(56) References Cited

OTHER PUBLICATIONS

Hamzah et al., "Optimization AES S-box/Inv S-box using FPGA Implementation," Journal of Telecommunication, Electronic and Computer Engineering (JTEC), vol. 9, No. 3-8, 2017, pp. 133-136. <http://journal.utem.edu.my/index.php/jtec/article/download/3112/2177>.

Rachh et al., "Implementation of AES S-Boxes using combinational Logic," 2008 IEEE International Symposium on Circuits and Systems (ISCAS), May 18-21, 2008, pp. 3294-3297.

Reyhani-Masoleh et al., "New Area Record for the AES Combined S-Box/Inverse S-Box," 2018 IEEE 25th Symposium on Computer Arithmetic (ARITH), Jun. 25-27, 2018, pp. 141-148.

Reyhani-Masoleh et al., "Smashing the Implementation Records of AES S-box," IACR Transactions on Cryptographic Hardware and Embedded Systems, vol. 2018, Issue 2, May 8, 2018, pp. 298-336.

Shastry et al., "A combinational logic implementation of S-box of AES," 2011 IEEE 54th International Midwest Symposium on Circuits and Systems (MWSCAS), Aug. 7-10, 2011, 5 pages.

\* cited by examiner

COMBINED SBOX AND INVERSE SBOX CRYPTOGRAPHY

BACKGROUND

Hardware security is becoming more important and more sophisticated over time as a result of the increased transmission of data using computing systems in everyday life (and the corresponding rise of more sophisticated illicit efforts to gain access to these data transmissions). For example, the increased prevalence of digital transactions that include sensitive information (such as financial information) are increasingly under attack by sophisticated criminals. Toward this end, hardware security often includes security measures that abide by advanced encryption standard (AES). AES includes specifications for encrypting data as set by the United States National Institute of Standards and Technology (NIST). AES relates to using ciphers such as block ciphers, which include deterministic algorithms to encrypt blocks via symmetric keys. Specifically, AES relates to using a member of the Rijndael block cipher.

SUMMARY

Aspects of the present disclosure relate to methods and systems relating to facilitating hardware implementation of combined SBox and inverse SBox for encryption and decryption. For example, the method includes receiving input plain text to be encrypted. The input plain text is received by shared hardware circuitry that defines logic for both Sbox generation and inverse Sbox generation via generation of a multiplicative inverse matrix as truth tables for data. The method further includes dividing, by the hardware circuitry, the input plain text to be encrypted. The method further includes feeding, by the hardware circuitry, multiplicative inverse values generated from the input plain text to a transformer module for performing affine to encrypt the plain text data. The method further includes receiving, by the hardware circuitry, encrypted data to be decrypted. The method further includes dividing, by the hardware circuitry, the encrypted data to be decrypted. The method further includes feeding, by the hardware circuitry, multiplicative inverse generated from the encrypted data to the transformer module for performing inverse affine to decrypt the encrypted data. A system configured to perform the above method are also disclosed.

Other aspects of the disclosure relate to hardware circuitry of a very high-speed integrated circuit hardware description language (VHDL) circuit. The hardware circuitry defines logic for both Sbox generation and inverse Sbox generation via a generated multiplicative inverse matrix as a truth table by identifying the multiplicative inverse matrix as the truth table for all possible 8-bit combinations over Galois Field via a Quine-McCluskey algorithm. The hardware circuitry further including a single 8×1 multiplexer and other electrical components configured to receive input plain text to be encrypted. The components of the hardware circuitry are further configured to divide the input plain text to be encrypted by dividing the input text into single octets. The components of the hardware circuitry are further configured to define four least significant bits (LSBs) and a bit from a most significant bit (MSB) of the input plain text to form 5 bits as the input for multiplicative inverse generation. The components of the hardware circuitry are further configured to feed the generated multiplicative inverse values to a transformer module for performing affine to encrypt the plain text data. The components of the hardware circuitry are further configured to receive encrypted data to be decrypted. The components of the hardware circuitry are further configured to divide the encrypted data to be decrypted. The components of the hardware circuitry are further configured to define four least significant bit (LSB) 4 bits and a bit from another most significant bit (MSB) of the encrypted data to form 5 bits as the input for multiplicative inverse generation. The components of the hardware circuitry are further configured to feed generated multiplicative inverse to the transformer module for performing inverse affine to decrypt the encrypted data.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to cryptographical hardware methods and systems, while more particular aspects relate to providing circuitry that is configured to execute the functionality of both a substitution box (S-Box, or SBox) and an inverse SBox. While the present disclosure is not necessarily limited to such applications, various aspects of the disclosure may be appreciated through a discussion of various examples using this context.

Encryption efforts in conventional computing hardware include the use of AES techniques. The AES techniques (whether using a block size of 128 bits, 192 bits, or 256 bits) may be sufficient to protect most classified information. These AES techniques involve the use of block ciphers and SBoxes that execute substitution (e.g., where input bits are transformed into output bits) to obscure relationships between keys and the ciphertext. SBoxes may utilize LUTs (arrays of values that replace runtime computations with array indexing operations) to perform these substitutions.

Conventional systems may include two SBoxes: a first SBox for encryption (this SBox referred to as simply an SBox herein), and a second SBox for decryption (this second SBox for decryption being referred to as an inverse SBox herein). Being as both an SBox an inverse SBox are required in conventional systems, these encryption components may dramatically increase a size of encryption hardware circuitry (and therein hardware circuitry of the system that uses the encryption), as this means that two 16×16 boxes need to be stored on the hardware circuitry. Fitting both the SBox and the inverse SBox on the hardware circuitry may be one of the most complex and expensive aspects of the AES component, given the amount of physical space that is required, the amount of power that is required, and the non-linear structure required to utilize both the SBox and the inverse SBox for conventional systems.

Further, in conventional systems, the SBox may be derived via the multiplicative inverse (MI) over a finite field or Galois field (GF). Specifically, the MI may be computed using composite field arithmetic, extended Euclidean algorithms and/or logarithmic methods. These methods may be relatively complex, as they utilize $GF(2^8)=GF(2)[x]/(x^8+x^4+x^3+x+1)$ (otherwise known as Rijndael's finite field), therein requiring hardware circuitry that can perform calculations using Rijndael's finite field. Put differently, a complexity of conventional systems may require a relatively large amount of resources for their computations (resources including both extra components and extra space on the circuit board(s)), therein decreasing throughput (and as such consuming more power).

Aspects of the disclosure may reduce the amount of space, components (e.g., where components include circuitry such as logic gates or the like), and/or power that is required to maintain the same encryption level by providing hardware that includes a combined SBox and Inverse SBox. Aspects of the disclosure may be incorporated into a very high-speed integrated circuit hardware description language (VHSIC-HDL, or VHDL) circuit that is configured to dynamically generate both the SBox and Inverse SBox values. Put differently, aspects of this disclosure are configured to generate (rather than store) the SBox and Inverse SBox using shared circuitry components. Towards this end, multiplicative inverse (MI) values may be generated from the input plain text which is to be encrypted (or encrypted data which is to be decrypted). These MI values may be calculated in a finite field over Galois field (GF).

As such, aspects of the disclosure relate to a method and apparatus for VHDL hardware implementation of a combined SBox and inverse SBox for encryption and decryption. Specifically, aspects of this disclosure relate to configuring VHDL hardware circuitry to "reuse" VHDL resources (e.g., circuitry components), such that these resources are configured to execute both encryption and decryption therein reducing area and power needs of the encryption and decryption components. For example, aspects of the disclosure may be able to reduce a total size of an integrated circuit (IC) that utilizes encryption and decryption by 50% or more compared to other conventional solutions. Further, aspects of the disclosure may reduce by 50% or more the maximum combinational path delay (measured in ns) of an IC, and/or reduce a number of stages to obtain MI from 32 stages to 8 stages for a combined SBox and inverse SBox implementation when compared to conventional solutions. Comparatively, the combined SBox and inverse SBox implementation may reduce about 75% of a cryptographic module. As described herein, this may be a result of aspects of the disclosure require only a single 8×1 multiplexer (mux) to arbitrate appropriate SBox values (as compared to conventional solutions that may utilize two 16×1 multiplexers), which may be reduce 50% or more of a required mux area.

In addition to generating MI for both SBox and inverse SBox in this efficient manner, aspects of the disclosure may additionally reduce an amount of required hardware circuitry as a result of reducing or eliminating methods that require complex mathematical computations. For example, conventional systems may require the computation of GF polynomial expansion and reduction to obtain MI values (therein requiring circuitry to execute these computations), whereas aspects of this disclosure do not need GF polynomial expansion and reduction to obtain MI values. Alternatively, aspects of this disclosure may meet various encryption and decryption standards with a truth table. For example, aspects of this disclosure may be utilized to meet encryption and decryption standards such as *camellia*, AES, SM4 hardware accelerator, and the like with this truth table as described herein.

Figure 1A:
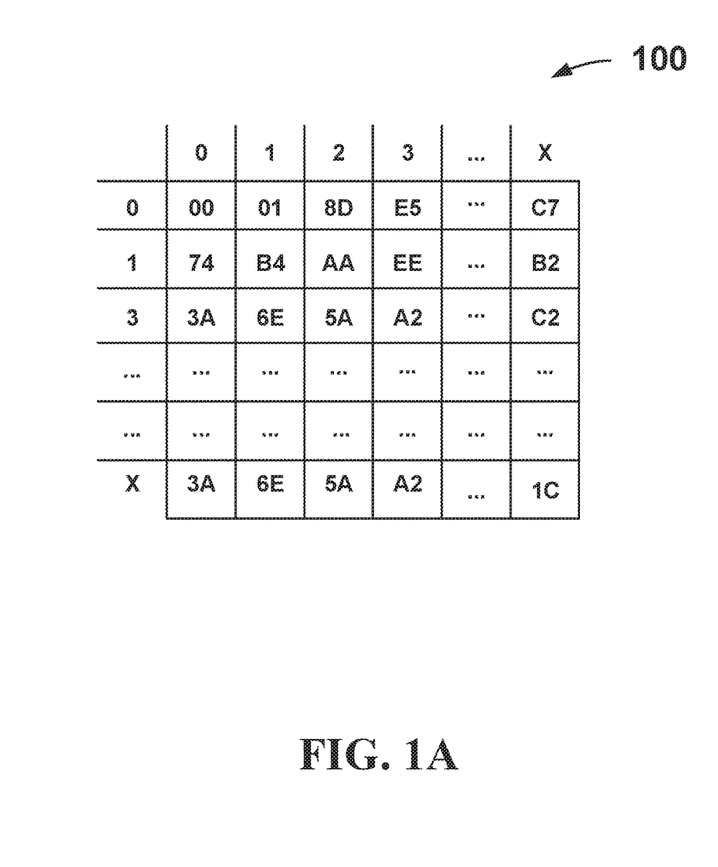
FIG. 1A depicts an example multiplicative inverse (MI) truth table for an encryption and decryption engine.
Figure 1B:
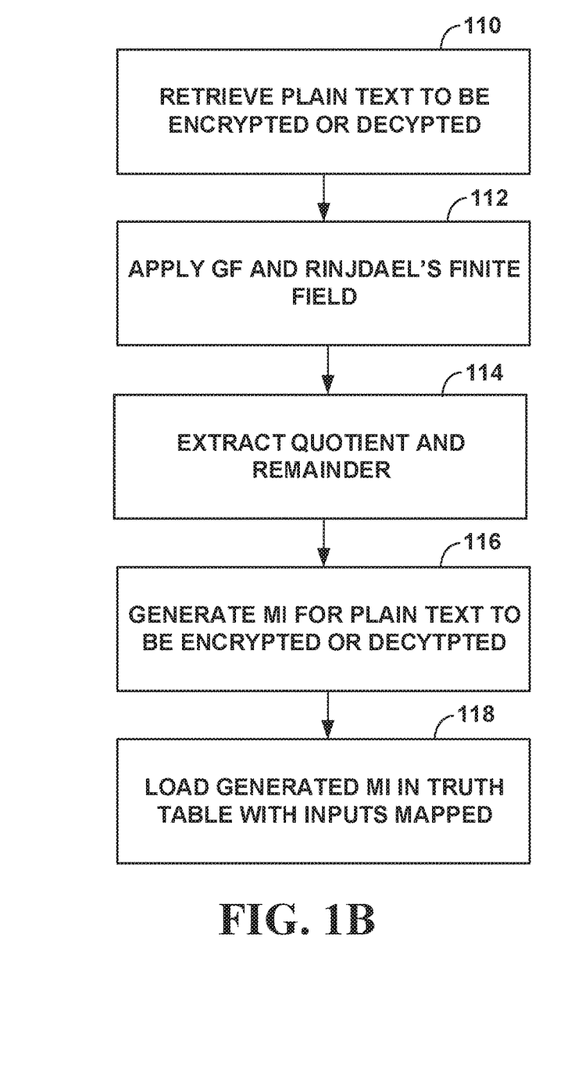
FIG. 1B depicts an example method of generating the example MI truth table of FIG. 1A.

For example, FIG. 1A depicts a truth table for the MI truth table 100 for an encryption and decryption engine, while FIG. 1B depicts an example method of pre-generating the MI truth table 100 of FIG. 1A (e.g., such that this truth table for the MI is configured to be usable for substantially any variation of input text). The MI truth table 100 is the "pre-generated" form of MI as discussed herein, such that this MI truth table 100 is therein subjected to the Quine-McCluskey method as described herein.

Columns of the MI truth table 100 indicate respective least significant bit (LSB) inputs, while rows indicate respective most significant bit (MSB) input. The method of FIG. 1B may be used for substantially all combinations of input plain text (e.g., plain text meaning text that has not been encrypted or decrypted) which is to be encrypted or decrypted. The method may begin by retrieving the plain text to be encrypted or decrypted (110). In some examples a retriever module may gather this data, in other examples other modules may feed this plain text to the encryption and decryption engine. Once retrieved, GF and Rijndael's finite field are applied (112). For example, the engine may apply GF and Rijndael's finite field via circuitry that executes:

$$GF(2^8)=GF(2)[x]/(x^8+x^4+x^3+x+1)$$

This may form the irreducible polynomial to be used for encryption and decryption. Also, as may be understood by one of ordinary skill in the art, applying GF and Rijndael's finite field in this way may account for polynomial division in GF ($2^8$).

Following GF being applied, the quotient and remainder may be extracted (114), and MI may be generated for the retrieved plain text to be encrypted and decrypted (116). The input plain text may be divided into 1 Octet wide segments of bits to form each input to be encrypted or decrypted according to the method of FIG. 1B. This generated MI may then be loaded into the truth table with inputs mapped (118), as depicted in FIG. 1B. In this way, aspects of the disclosure may form a single 16×16 matrix which is used as a "base" for VHDL design for both encryption and decryption.

The MI may be calculated in many ways. For example, the MI may be calculated using a Quine-McCluskey algorithm, or other such Boolean function minimization algorithms.

Figure 2:
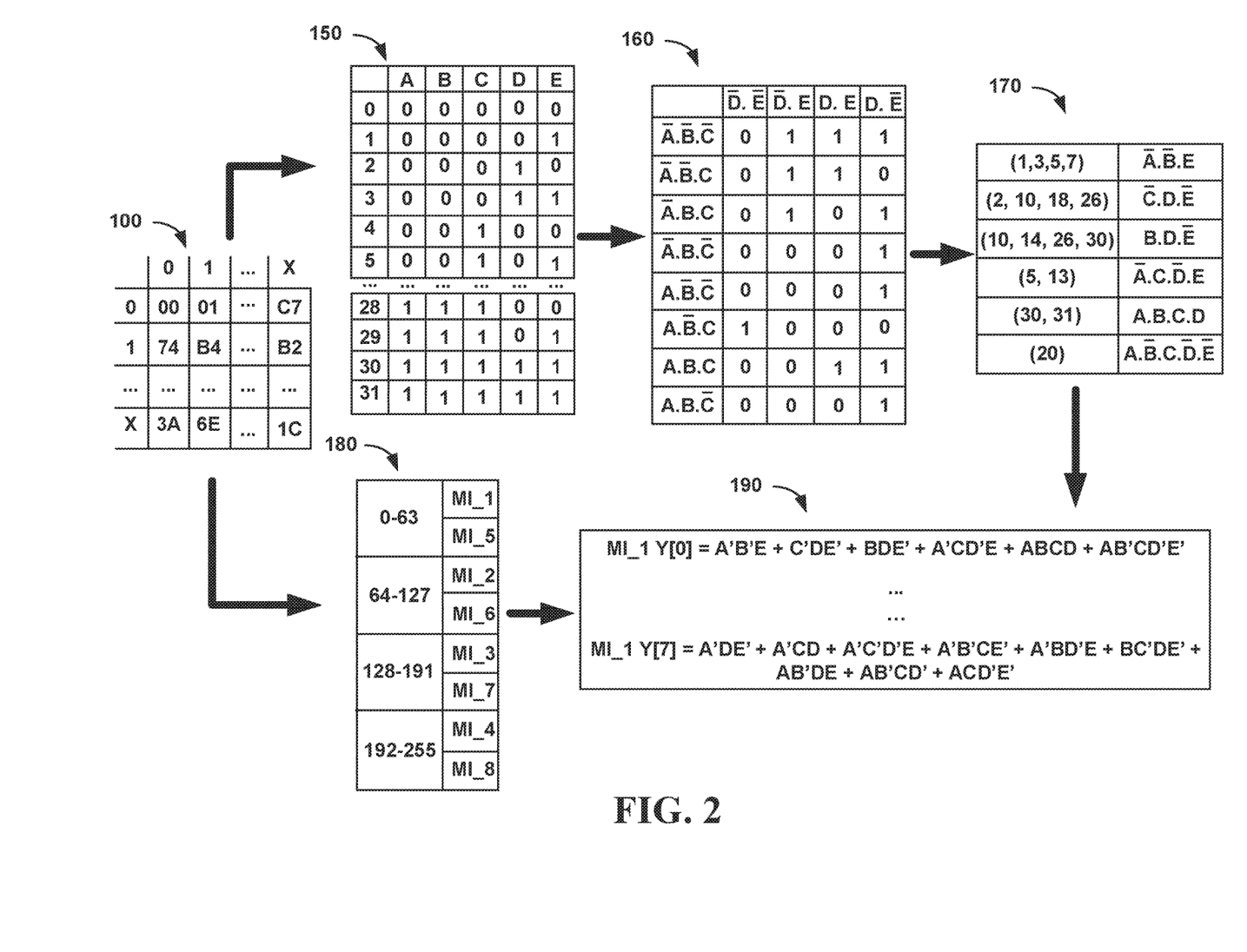
FIG. 2 depicts a conceptual flowchart of determining MI equations for a combined SBox and inverse SBox for Very High-speed integrated circuit hardware Description Language (VHDL) circuitry.

FIG. 2 depicts a data flowchart of how data may be processed to calculate the MI using the Quine-McCluskey tabular method. The data flowchart of FIG. 2 includes a condensed form of MI truth table 100, truth table 150, map 160, group chart 170, hardware module chart 180, and sample equations 190. This method may include a Boolean reduction technique reducing, e.g., five input variables (variables depicted in the Figures as I[1], I[2], I[3], I[4], I[5], etc.). Input variables may be reduced using one or more Boolean minimization techniques (such as the Quine-McCluskey algorithm). For example, as depicted in FIG. 2, the MI truth table 100 may be utilized, where the four least significant bits (LSB) may be combined with the most significant bit (MSB) to form truth table 150. Truth table 150 may include a plurality of 5-bit segments. Truth table 150 may then be used for MI to determine 8-bit inputs.

Further, the hardware may be configured to utilize the Quine-McCluskey algorithm to reduce these 5-bit inputs against the MI from the truth table by utilizing map 160 of bits and group chart 170. Map 160 is representative of the "minterms" determined via the Quine-McCluskey algorithm, while group chart 170 is representative of the prime implicants determined via the Quine-McCluskey algorithm. Additionally, entries from the MI truth table 100 may be clustered together into 4 groups of entries and matched to hardware modules as depicted in chart hardware module 180. These hardware modules (MI_1-MI_8) may include circuitry components configured to execute the functionality described herein (e.g., such as example circuitry from circuit diagram 300 of hardware module 5 MI_5 discussed regarding FIG. 4 below). From here, the Quine-McCluskey may be executed for each of the eight hardware modules from MI_1 to MI_8, therein forming 8-bit equations for each module. For example, as depicted in sample equations, the hardware may be configured to calculate MI by executing such calculations as MI_1 Y[7]=A'DE'+A'CD+A'C'D'E+ A'B'CE'+A'BD'E+BC'DE'+AB'DE+AB'CD'+ACD'E'.

Once the one or more MIs are generated and/or obtained, these MIs may be fed to a transformer module. This transformer module may be configured to execute affine or inverse affine. The transformer module may execute affine or inverse affine depending on whether this transformer module encrypting or decrypting the yielded SBox or inverse SBox values, respectively.

Figure 3:
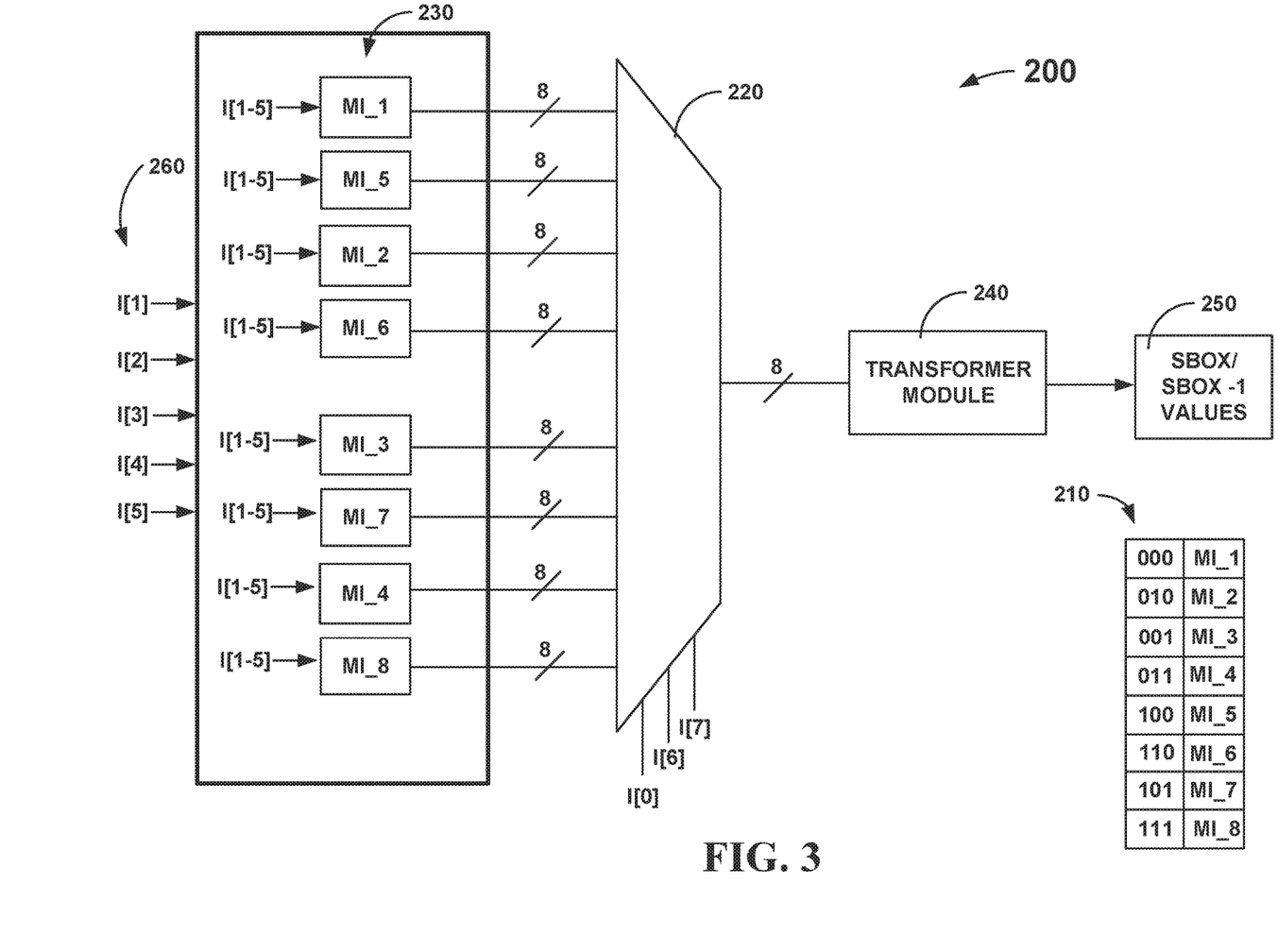
FIG. 3 depicts a conceptual block diagram of an example VHDL circuitry for a combined SBox and inverse SBox.

SBox and Inverse SBox can be determined using truth table realization, composite field arithmetic, a logarithmic method, a look-up table (LUT) based method, or the like. For example, FIG. 3 depicts a conceptual box diagram of example VHDL hardware circuitry 200 that provides combined SBox and inverse SBox functionality. FIG. 3 depicts hardware circuitry 200 that provides the pre-generated MI truth tables and Boolean reduction techniques described herein using combinational logic approach. For example, as depicted in FIG. 3, mux 220 is connected via an 8-line bus to array 230 of the hardware modules MI_1-MI_8. This array 230 may receive the five-bit inputs 260 as described above. Specifically, input bits of I[1], I[2], I[3], I[4], and I[5] may be used as an input for all hardware modules MI_1-MI_8.

As spelled out in design details 210, the different mux inputs (depicted as I[1-5] in FIG. 3) may be coupled to different hardware modules (MI_1-MI_8) of array 230. Mux 220 may then feed into transformer module 240 described herein that is configured to either encrypt or decrypt (as described herein) this fed data, therein outputting SBox or Inverse SBox (depicted as SBox-1) values 250.

Figure 4:
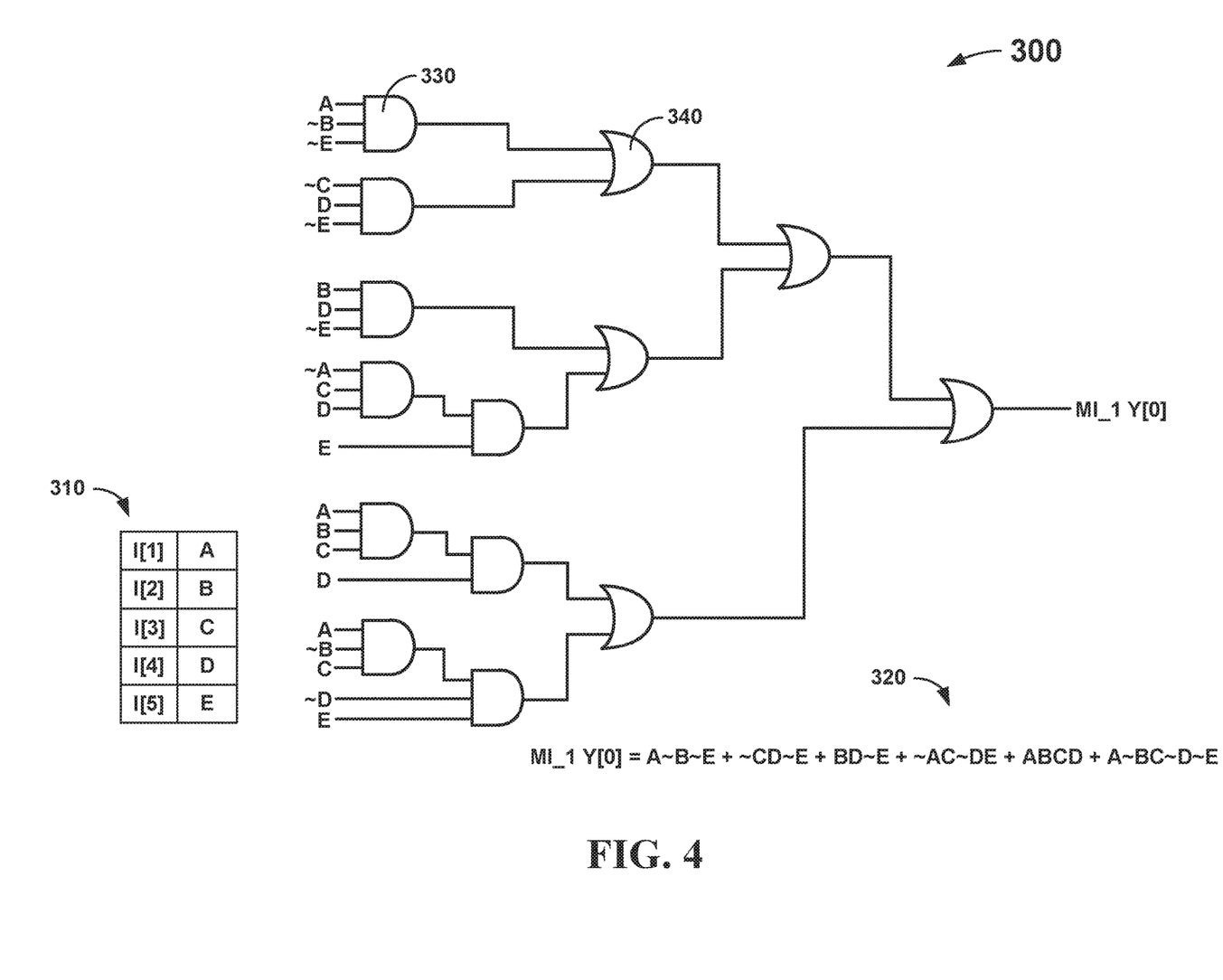
FIG. 4 depicts a conceptual circuit diagram of an example hardware module MI_1 that yields MI=1Y[0] of the VHDL circuitry of FIG. 3.

Diving in deeper into possible implementation details, FIG. 4 depicts an example conceptual circuit diagram 300 of some of VHDL circuitry 200 that is consistent with this disclosure. Specifically, the circuitry of FIG. 4 depicts the five-bit inputs (mapped per input bits mapping chart 310) as received by circuit diagram 300 to yield MI_1 Y[0] (e.g., for the hardware module MI_1). As depicted, circuit diagram 300 of hardware diagram MI_1 includes a plurality of AND gates 330 and OR gates 340 to yield MI_1 Y[0]. For example, as depicted, circuit diagram 300 may functionally create a logical structure of MI_1 Y[0]=A~B~E+~CD~E+ BD~E+~AC~DE+ABCD+A~BC~D~E. It is to be understood that the specific arrangement of gates and inputs as depicted in circuit diagram 300 is for purposes of illustration only, as other circuit diagrams 300 consistent with this disclosure may also yield MI_1 Y[0].

Further, as will be understood by one of skill in the art, each of the hardware modules MI_1-MI_8 may have unique equations (as realized in circuitry equivalent to circuitry diagram 300) that may be executed in response to these hardware modules MI_1-MI_8 being called upon. For example, hardware module 5 (e.g., MI_5) may include sample equations of:

y0=ABE'+ABC+A'B'D'E+A'B'DE+A'B'CE'+A'CD'E'+ A'BC'E+A'BC'D+AB'D'E+AB'C'D;
y16=A'C'D'E+A'C'DE'+A'CD'E'+A'CDE+B'CDE+BC'DE+ AB'D'E+ABCD'E+ABCDE';
y2=BD'E'+BCD'+ABD'+A'CD'E'+AB'C'E'+AB'DE'+ ACD'E+A'B'C'D'E+A'B'CDE+A'BC'DE;
y3=BD'E+ABDE'+AB'C'D+A'CD'E'+A'BC'D+ABCD+ AB'D'E';
y4=A'B'C'E+A'B'C'D+A'C'DE+A'BD'E'+BCD'E'+BCDE+ AB'D'E+ABDE';
y5=B'C'D'E+A'BC'E'+BCD'E'+AB'C'D'+ABD'E+ABDE'+ A'B'CDE'+A'BCDE;
y6=C'E+B'D+A'B'C+BD'E+AC'D'+A'CDE'; and
y7=B'C'E+B'DE+A'CE+A'B'CD+A'BC'D'E'+ABCDE', where hardware module MI_5 is selected (and therein one or more of these equations are processed) when mux 220 inputs include: I[0]=1; I[6]=0; I[7]=0; and: A=I[1]; B=I[2]; C=I[3]; D=I[4]; and E=I[5].

As such, aspects of this disclosure may provide transformer module 240 that is configured to determine, from its input (e.g., the output of mux 220, which is fed into transformer module 240), whether to determine whether to execute SBox functionality to encrypt the received values or execute inverse SBox functionality to decrypt the received values. The transformer module 240 may execute both the encryption and decryption services using the same hardware resources (e.g., such as the same 8×1 mux 220). As such, this hardware may utilize "common" MI values from an 8×1 mux and corresponding input select bits. Further, as would be understood of ordinary skill in the art, aspects of this disclosure may be configured to determine SBox and inverse SBox values in this way, aspects of this disclosure may be configured to determine MI values without having to execute GF polynomial expansion and reduction (e.g., such that the hardware circuitry described herein determines MI values without circuitry configured to calculate GF polynomial expansion and reduction).

In this way, aspects of this disclosure may provide an AES-level encryption engine that is configured to encrypt and decrypt data using the same 16×16 matrix that can be used as a base for both encryption and decryption. For example, to encrypt, e.g., a 128-bit key and plain text with 128-bit encryption, the plain text may be provided to a first "port" of the encryption engine (e.g., an identified entry logic gate of the hardware circuitry). Following this, there may be key generation for the key, and the plain text may be processed by the SBox described herein. This may include shifting rows, followed by mixing columns. Following this, the plain text may be meshed with the key, and the encrypted data is sent out via a second port of the hardware circuitry.

Conversely, to decrypt data with 128-bit encryption via the encryption engine described herein, the 128-bit key and currently encrypted data may be received via the second port. Following this, the encryption engine may generate the key, while the plain text has an inverse row shift executed as understood by one of ordinary skill in the art, after which the SBox functionality described herein may process the encrypted data. After processing, the columns may be "inverse mixed" up, and then aligned with the key, upon which the decrypted data may be transmitted out from the encryption engine via the first port.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

Aspects of the present invention are described herein with reference to flowchart illustrations and/or block diagrams of methods and apparatus (systems) according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   receiving, by shared hardware circuitry that defines logic for both Sbox encryption and inverse Sbox decryption via generation of multiplicative inverse matrices as truth tables for data, input plain text to be encrypted;
   dividing, by the shared hardware circuitry, the input plain text to be encrypted by dividing the input text into single octets;
   feeding, by the shared hardware circuitry, multiplicative inverse values generated from the input plain text to a transformer module for performing affine to encrypt the plain text data;
   receiving, by the shared hardware circuitry, encrypted data to be decrypted;
   dividing, by the shared hardware circuitry, the encrypted data to be decrypted; and
   feeding, by the shared hardware circuitry, multiplicative inverse generated from the encrypted data to the transformer module for performing inverse affine to decrypt the encrypted data.

2. The method of claim 1, wherein:
   the multiplicative inverse values generated from the input plain text is generated by defining, by the shared hardware circuitry, four least significant bits (LSBs) and a bit from a most significant bit (MSB) from the input plain text to form 5 bits as the input for multiplicative inverse generation; and
   the multiplicative inverse generated from the encrypted data is generated by defining, by the hardware circuitry, four least significant bits (LSBs) and a bit from a most significant bit (MSB) from the encrypted data to form 5 bits as the input for multiplicative inverse generation.

3. The method of claim 1, wherein the shared hardware circuitry is implemented as part of a very high-speed integrated circuit hardware description language (VHDL) circuit.

4. The method of claim 1, wherein generating the multiplicative inverse matrices as the truth tables includes identifying the multiplicative inverse matrices as the truth tables for all possible 8-bit combinations over Galois Field.

5. The method of claim 1, wherein the shared hardware circuitry includes only a single 8x1 multiplexer in defining logic for both Sbox generation and inverse Sbox generation.

6. The method of claim 1, wherein the shared hardware circuitry generates the multiplicative inverse matrix via a Quine-McCluskey algorithm.

7. The method of claim 1, wherein the shared hardware circuitry encrypts the plain text data and decrypts the encrypted data without computing Galois field polynomial expansion and reduction to obtain respective multiplicative inverse values.

8. A system comprising: shared hardware circuitry that defines logic for both Sbox encryption and inverse Sbox decryption via generation of multiplicative inverse matrices as truth tables for data, the shared hardware circuitry further including circuitry components configured to: receive input plain text to be encrypted; divide the input plain text to be encrypted by dividing the input text into single octets; feed multiplicative inverse values generated from the input plain text to a transformer module for performing affine to encrypt the plain text data; receive encrypted data to be decrypted; divide the encrypted data to be decrypted; and feed multiplicative inverse values generated from the encrypted data to the transformer module for performing inverse affine to decrypt the encrypted data.

9. The system of claim 8, wherein:
   the multiplicative inverse values generated from the input plain text is generated by the shared hardware circuitry further including circuitry components configured to define four least significant bits (LSBs) and a bit from a most significant bit (MSB) from the input plain text to form 5 bits as the input for multiplicative inverse generation;
   the multiplicative inverse values generated from the encrypted data is generated by the shared hardware circuitry further including circuitry components configured to define four least significant bits (LSBs) and a bit from a most significant bit (MSB) from the encrypted data to form 5 bits as the input for multiplicative inverse generation.

10. The system of claim 8, wherein the hardware circuitry is implemented as part of a very high-speed integrated circuit hardware description language (VHDL) circuit.

11. The system of claim 8, wherein generating the multiplicative inverse matrix as the truth table includes identifying the multiplicative inverse matrix as the truth table for all possible 8-bit combinations over Galois Field.

12. The system of claim 8, wherein the shared hardware circuitry includes a single 8x1 multiplexer.

13. The system of claim 8, wherein the shared hardware circuitry generates the multiplicative inverse matrix via a Quine-McCluskey algorithm.

14. The system of claim 8, wherein the circuitry components are further configured to encrypt the plain text data and decrypt the encrypted data without computing Galois field polynomial expansion and reduction to obtain respective multiplicative inverse values.

15. A system comprising:
  hardware circuitry of a very high-speed integrated circuit hardware description language (VHDL) circuit, wherein the hardware circuitry defines logic for both Sbox generation and inverse Sbox generation via a generated multiplicative inverse matrix as a truth table by identifying the multiplicative inverse matrix as the truth table for all possible 8-bit combinations over Galois Field via a Quine-McCluskey algorithm, the hardware circuitry further including a single 8x1 multiplexer and other electrical components configured to:
  receive input plain text to be encrypted;
  divide the input plain text to be encrypted by dividing the input text into single octets;
  define four least significant bits (LSBs) and a bit from a most significant bit (MSB) of the input plain text to form 5 bits as the input for multiplicative inverse generation;
  feed generated multiplicative inverse values to a transformer module for performing affine to encrypt the plain text data;
  receive encrypted data to be decrypted;
  divide the encrypted data to be decrypted;
  define four least significant bit (LSB) 4 bits and a bit from another most significant bit (MSB) of the encrypted data to form 5 bits as the input for multiplicative inverse generation; and
  feed generated multiplicative inverse to the transformer module for performing inverse affine to decrypt the encrypted data.

* * * * *